May 10, 1966   C. D. DRANSFIELD ETAL   3,250,980
SERVOMECHANISM
Original Filed July 17, 1958   2 Sheets-Sheet 1

INVENTORS
John P. Woods
Clifford D. Dransfield
Tom Prickett, Jr.

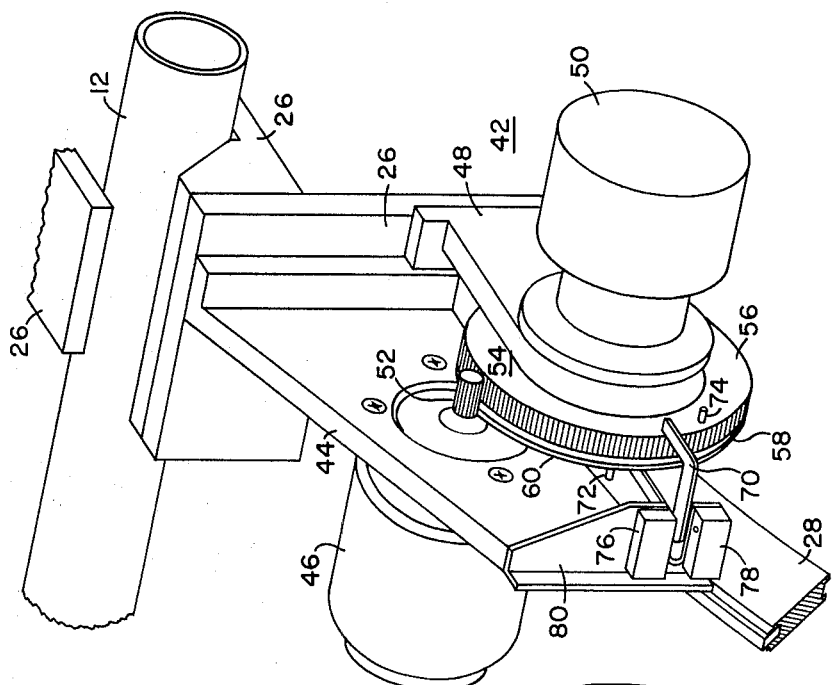
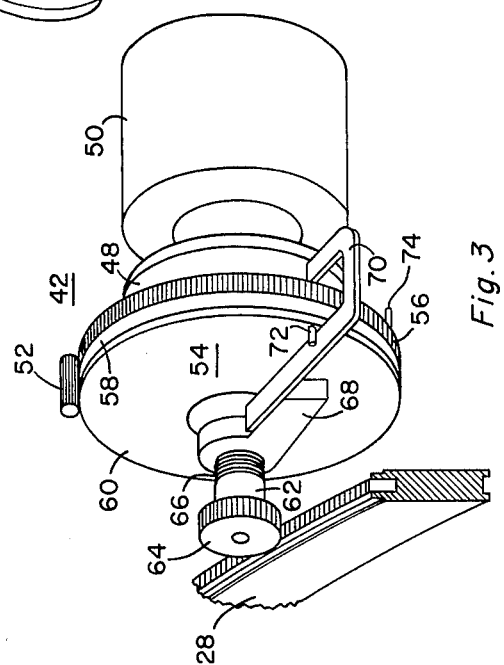

United States Patent Office 3,250,980
Patented May 10, 1966

3,250,980
SERVOMECHANISM
Clifford D. Dransfield and John P. Woods, Dallas, and Tom Prickett, Jr., Richardson, Tex., assignors to The Atlantic Refining Company, Philadelphia, Pa., a corporation of Pennsylvania
Original application July 17, 1958, Ser. No. 749,190. Divided and this application Mar. 4, 1965, Ser. No. 437,069
3 Claims. (Cl. 318—470)

This application is a division of application Serial No. 749,190, filed July 17, 1958, in the names of John P. Woods, Clifford D. Dransfield and Tom Prickett, Jr.

The present invention relates to a novel servomechanism for use with apparatus for correcting seismic records to produce cross section plots of the subsurface.

Reference is made to the drawings wherein:

FIGURES 2 and 3 are isometric, right- and left-hand views, respectively, showing the details of a translator for imparting arcuate motion to a recording or detecting element carried by a sector.

Figure 1:
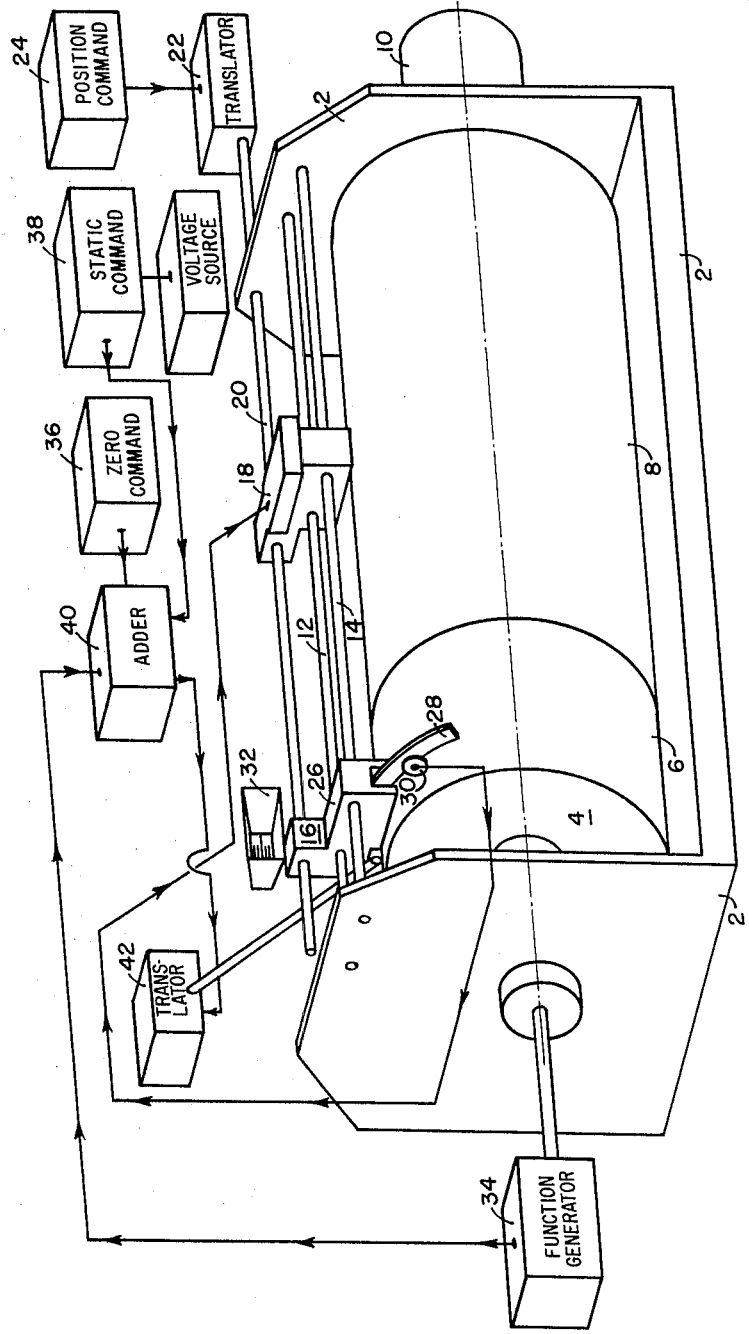
FIGURE 1 is a schematic of the over-all record corrector or profile plotter claimed in the parent application.

In accordance with the invention disclosed in the parent application, time or depth correlation of significant features of a plurality of seismic traces and application of each significant feature of each seismic trace to true travel time or true depth references can be accomplished by sequentially detecting the seismic traces from a field record while concomitantly changing the point on each said seismic trace at which each incremental portion of the trace is detected in accordance with an electrical command signal which is a function of predetermined correction data. Novel components of the apparatus of this invention include a novel servo operated mechanism for changing the relative spatial position of the detector with respect to a seismic trace in response to an electrical command signal to which the present application is directed.

Referring in detail to FIGURE 1 of the drawings, the over-all record corrector is made up of the basic components designated below. The entire record corrector is mounted on frame 2. Rotatable drum 4 is supported by a suitable shaft and bearings (not shown) on frame 2. Drum 4 is made up of a field record carrying portion 6 and a cross section map carrying portion 8. Drum 4 is rotated by suitable means, such as a motor 10. Bars 12 and 14 are rigidly connected to frame member 2 above drum 4. Slidably mounted on bars 12 and 14 adjacent field record portion 6 of drum 4 is detector unit 16. Detector unit 16 is electrically connected directly to recorder 18. It is desirable in most cases to include a signal amplifier in the electrical line connecting detector unit 16 and recorder 18, and, depending upon the form in which the seismic trace is recorded, some form of signal converter, such as a demodulator. However, these elements are conventional, and their inclusion or exclusion would be obvious to one skilled in the art. Accordingly, in referring to a "direct electrical connection" between detector unit 16 and recorder 18, such necessary components are assumed to be included, and the direct electrical connection between detector unit 16 and recorder 18 is meant to exclude only auxiliary transfer mediums on which the seismic signal is stored prior to or during the process of correction, as is the universal practice in all prior art automatic record correctors. Recorder 18 is also slidably mounted on bars 12 and 14 and is, of course, mounted adjacent cross section map portion 8 of drum 4. Bar 20 is slidably mounted on frame member 2 above drum 4 and is coupled to detector unit 16 and recorder 18 in a manner such that detector unit 16 and recorder 18 may be moved parallel to the axis of drum 4 in predetermined, discrete steps following the detection and recordation of each successive seismic trace. Appropriate motion is imparted to bar 20 by translator 22 which is adapted to convert a received electrical command signal to mechanical motion. The electrical command signal to translator 22 is supplied by position command 24.

Detector unit 16 includes frame member 26, sector 28 and pickup element 30. Sector 28 is slidably mounted on frame member 26 in such a manner that sector 28 will describe an arcuate path about field record portion 6 of drum 4. Pickup element 30 is mounted on sector 28 closely adjacent to field record portion 6 of drum 4. Frame member 26 of detector unit 16 also carries visual display mechanism 32 which continuously provides a visual representation of the position of pickup element 30 relative to a selected reference point.

Function generator 34 is adapted to produce a varying voltage proportional to the dynamic correction factor $Y = f(X)$ and is preferably directly coupled to the shaft of drum 4 for reasons which will be discussed hereinafter. As stated previously, the variable function represented by the command voltage of function generator 34 introduces a dynamic correction which varies along the length of each seismic trace either continuously or in discrete steps. Zero command 36 is adapted to produce a voltage proportional to a predetermined difference between a selected reference point on the field record and a fixed reference point along the variable function, a fixed reference point on the cross section map, a like fixed reference point, or a combination of such fixed reference points. Static command 38 is adapted to produce at least one nonvarying or constant voltage proportional to a static correction which is the same throughout the length of each seismic trace but in some instances differs for each trace. Accordingly, a separate and distinct voltage should be provided for each seismic trace, and the appropriate voltage must be applied to each succeeding trace following the detection and recordation of each previous trace, as will be more fully explained hereinafter.

The voltage produced by function generator 34, zero command 36, and static command 38 are combined or algebraically added by adder 40. The output voltage of adder 40 is in turn fed to translator 42 which is adapted to convert this command voltage to mechanical motion. This mechanical motion is employed to slide sector 28 in its support and describe an arcuate path about field record portion 6 of drum 4. Obviously, this movement of sector 28 will serve to change the spatial relationship between pickup element 30 and a seismic trace passing a given point at a constant speed and pick up significant features of a seismic trace earlier or later than they would be picked up by a fixed pickup element. It is to be observed that, in contrast to this ability of the movable pickup of this invention to apply "positive or negative" corrections, i.e., to advance or delay a feature of the record, the prior art correctors referred to previously are restricted to correction by delay only.

Translator 42 of FIGURE 1 may be any suitable means for converting an electrical command signal to a mechanical arcuate movement of sector 28.

In its preferred form, translator 42 is a conventional servomechanism wherein a D.C. command voltage from adder 40 is fed to a comparator or "add-or-subtract" circuit. In the comparator circuit, the command voltage is compared with a second D.C. voltage which is representative of and proportional to the relative position of sector 28. The error voltage produced by the comparator circuit is fed to a conventional chopper to convert the error voltage to an A.C. signal. This A.C. signal is amplified by a conventional servo amplifier and is employed to operate a conventional A.C. servomotor. The servomotor is coupled to sector 28 and moves sector 28 in one direction or the other depending upon the resultant of the command and error voltages.

Although the external circuit of the servomechanism, described immediately above, is conventional, FIGURES 2 and 3 of the drawings show a novel system for driving sector 28 which incorporates several unusual protective features designed to overcome chatter and backlash in the drive system and to protect the basic components of the system.

Referring in detail to FIGURES 2 and 3, the servomechanism for driving sector 28 is designated generally by the numeral 42. Although translator 42 is shown physically separated from frame member 26 of detector unit 16 for purposes of simplifying the relationship of components shown in FIGURE 1, translator 42 is, in fact, mounted on frame member 26. Rigidly attached to forward extension 44 of frame member 26 is servomotor 46. As stated previously, servomotor 46 is preferably a conventional A.C. servomotor. Also attached to frame member 26 is forward extension 48, parallel to extension 44, designed to support feedback transducer 50. Feedback transducer 50 is a conventional type of potentiometer and in its preferred form has a maximum range of three revolutions.

Gear 52 is formed on the protruding end of the shaft of servomotor 46 and passes through extension 44 of frame member 26. Gear 54 is rigidly attached to the shaft of potentiometer 50 and cooperatively engages gear 52. Gear 54 is preferably made in three sections, a nylon portion 56 carrying the gear teeth, an intermediate section 58 consisting of a resilient disk having approximately the same diameter as the pitch of the gear teeth on section 56, and a back-up section 60 adapted to hold disk 58 rigidly on section 56 of the gear.

Mounted on the end of extension 62 of the shaft of potentiometer 50 is gear 64 which cooperatively engages teeth formed on sector 28. Formed near the end of potentiometer shaft extension 62 is a left-hand threaded section 66. Threadably mounted on threaded section 66 of potentiometer shaft extension 62 is follower block 68. In its preferred form, follower block 68 is also made of nylon. Rigidly attached to follower block 68 is spring metal contact means 70 which cooperates with stop pins 72 and 74 which are mounted on sections 60 and 56, respectively, of gear 54. Cooperating with spring metal contact means 70 are cut-off microswitch 76 and 78 which are electrically connected to servomotor 46 and are rigidly attached to plate 80 which, in turn, is rigidly attached to extension 44 of frame 26.

The lead of threaded section 66 of potentiometer shaft extension 62 and the position and length of stop pins 72 and 74 are selected such that three complete revolutions of the shaft of potentiometer 50 will laterally move spring metal contact 70 out of contact with one of the stop pins and into contact with the other of the stop pins. Thus, as servomotor 46 rotates the shaft of potentiometer 50 and gear 54 in a counter-clockwise direction, pin 72 will contact spring metal contact 70 and urge spring metal contact 70 toward microswitch 78 and away from microswitch 76. Microswitch 78 will break the circuit to servomotor 46 thus stopping the initial rotation of the servomotor. Spring metal contact 70 also serves to reduce the shock load on a sudden stop by virtue of its resilience. Similarly, when the signal to servomotor 46 causes a clockwise rotation of three revolutions of the shaft of potentiometer 50 and gear 54, spring metal contact 70 will be moved out of contact with stop pin 72 and into contact with stop pin 74. Contact 70 will then be forced into contact with microswitch 76 breaking the circuit to the servomotor and rotation of servomotor 46 will be stopped.

It is obvious from the above description of the relationship of the component parts that a number of control functions are performed by the cooperation of spring metal contact 70, stop pins 72 and 74, and microswitches 76 and 78. First, these elements cooperate to prevent overrunning of gear 64 on sector 28 in either direction. Secondly, these elements prevent rotation of potentiometer 50 beyond its maximum allowable limits and thus act as a protective device to prevent damage to the potentiometer. In addition, the spring action of spring metal contact 70 prevents damage to the gear teeth or the other components by absorbing the shock of a sudden stop.

Resilient section 56 of gear 54 also performs the highly desirable functions of preventing chattering between gear 54 and gear 52 and preventing backlash in the system. Although a number of conventional anti-backlash and anti-chattering mechanisms have been tested for use in the translator mechanism, it has been found that the simple modified gear having resilient section 56 is far superior.

We claim:

1. In a servomechanism having a feedback transducer operatively associated with a servomotor, the improvement comprising:
   (a) circular gear means attached to a spindle extending from said feedback transducer,
   (b) positive stop elements mounted on either side of said gear means,
   (c) lead screw means formed near the end of said spindle,
   (d) follower block means cooperatively engaging said lead screw means,
   (e) contact means having one end rigidly attached to said follower block and the other end adjacent said positive stop elements, the lead of said lead screw means being such that said contact means engages one of said positive stop means at one extremity of the rotational range of said feedback transducer and engages the other of said positive stop means at the other extremity of the rotational range of said error voltage producing means, and
   (f) cut-off switch means electrically connected in the input circuit to said servomotor and mounted adjacent said contact means so that said positive stop elements force said other end of said contact means into operative contact with said switch means and break the circuit to said servomotor.

2. Apparatus in accordance with claim 1 wherein the contact means is a resilient spring element.

3. Apparatus in accordance with claim 1 wherein the circular gear means includes a tooth-carrying section and a resilient section having a diameter equal to the pitch of said gear teeth rigidly coupled to said tooth-carrying section.

References Cited by the Examiner

UNITED STATES PATENTS 2,566,897   9/1951   Koenig _____ 318—470

ORIS L. RADER, *Primary Examiner.*

J. C. BERENZWEIG, *Assistant Examiner.*